United States Patent [19]
Kass et al.

[11] Patent Number: 5,465,991
[45] Date of Patent: Nov. 14, 1995

[54] WEIGHT DISTRIBUTING HITCH

[75] Inventors: John J. Kass, Granger, Ind.; Philip K. Hoopes, Union, Mich.; Wayne E. Sously, Elkhart, Ind.; Graeme H. Aspinall, Scoresby, Australia

[73] Assignee: Reese Products, Inc., Elkhart, Ind.

[21] Appl. No.: 355,376

[22] Filed: Dec. 13, 1994

Related U.S. Application Data

[63] Continuation-in-part of Ser. No. 138,172, Oct. 15, 1993, Pat. No. 5,375,867.

[30] Foreign Application Priority Data

Sep. 21, 1994 [AU] Australia .................. 74128/94

[51] Int. Cl.⁶ ................................ B60D 1/42
[52] U.S. Cl. ............... 280/457; 280/490.1; 280/407; 280/406.2; 74/527; 403/374
[58] Field of Search ............... 280/456.1, 457, 280/460.1, 461.1, 462, 483, 488, 490.1, 511, 405.1, 406.1, 407, 755, 406.2, 512; 74/527; 403/374, 373, 409.1

[56] References Cited

U.S. PATENT DOCUMENTS

| | | | |
|---|---|---|---|
| 3,151,879 | 10/1964 | Bock | 280/406.2 |
| 3,194,584 | 7/1965 | Reese | 280/406.2 |
| 3,649,046 | 3/1972 | Mathisen | 280/406.2 |
| 3,655,221 | 4/1972 | Warner | 280/406.2 X |
| 4,033,601 | 7/1977 | Lindahl et al. | 280/490.1 |
| 4,211,427 | 7/1980 | Young et al. | 280/406.2 |
| 4,792,151 | 12/1988 | Feld | 280/406.2 |
| 5,222,754 | 6/1993 | Few | 280/455.1 |

*Primary Examiner*—Mitchell J. Hill
*Assistant Examiner*—F. Zeender
*Attorney, Agent, or Firm*—King & Schickli

[57] ABSTRACT

A weight distributing hitch for towing a trailer behind a vehicle includes a hitch bar for mounting to the vehicle and a ball mount head for mounting on the hitch bar at a selected tilt angle. A pair of spring bars are mounted to the ball mount head. These spring bars distribute the weight of the trailer relative to the vehicle. Each spring bar is substantially L-shaped and includes a turned groove at a proximal end received in a cooperating aperture in the ball mount head. A retainer of spring steel engages in the grooves to hold the spring bars in position. The relative tilt angle of the ball mount head is adjusted by means of an eccentric angle adjusting element in the form of a washer. This washer is fixed to one of the ball mount head or hitch bar and includes a cam surface for engaging the other of the two elements.

9 Claims, 4 Drawing Sheets

Fig. 1

WEIGHT DISTRIBUTING HITCH

This is a Continuation-In-Part of U.S. patent application Ser. No. 08/138,172, filed Oct. 15, 1993, U.S. Pat. No. 5,375,867, and also entitled "Weight Distributing Hitch".

TECHNICAL FIELD

The present invention relates generally to the trailer towing field and, more particularly, to a new and improved weight distributing hitch assembly and method of adjusting the tilt angle of the ball mount head on the hitch assembly bar of such an assembly.

BACKGROUND OF THE INVENTION

Hitch assemblies for evenly distributing the tongue weight of a trailer over the front and rear wheels of a towing vehicle are well known in the art. Present state of the art designs for round bar weight distributing hitch assemblies include a hitch bar, for mounting in the receiver box of a hitch receiver connected to the vehicle, and a ball mount head. The ball mount head is fabricated from parallel top and bottom plates welded to a yoke for receiving the mounting rack of the hitch bar. Two tubes are welded between the top and bottom plates. Holes are provided in the tubes for spring loaded pins adapted to retain the round spring bars in position. The angular adjustment of the ball mount head is made by stacking washers on a locating pin between the ball mount head and the hitch bar mounting rack. Reese Products, Inc., product numbers 61200, 61202 and 61204 are representative of weight distributing hitch assemblies of the type just described.

While such a weight distributing hitch assembly is effective in evenly distributing weight between the front and rear wheels of a towing vehicle, installation and adjustment of the hitch assembly is presently somewhat time consuming and inconvenient. Specifically, the adjustment of this prior art design requires that the spring bars and associated hardware be removed and that washers be added or removed from the locating pin. The spring bars and hardware must then be reinstalled.

It should also be appreciated that in prior art designs the spring bar retainer pins are held in place by a flat spring. This flat spring may become overstressed with repeated removal and reinstallation of the spring bars. Further, when bent, the flat spring must be replaced. As the flat spring is fastened in place with a drive screw, the screw must be pried or drilled out to replace the spring. Again, this represents a significant inconvenience and an added repair expense to the operator.

Accordingly, a need is identified for a weight distributing hitch assembly of improved design that is more convenient to adjust and install and that secures the spring bars in position with greater reliability over a longer service life.

SUMMARY OF THE INVENTION

Accordingly, it is a primary object of the present invention to provide a weight distributing hitch assembly of improved design especially adapted for towing a trailer behind a vehicle.

Another object of the present invention is to provide a weight distributing hitch assembly incorporating a unique eccentric adjustment mechanism that allows the tilt angle between the ball mount head and hitch bar of the hitch assembly to be selectively adjusted as required to properly distribute the tongue weight of the trailer equally over the front and rear wheels of the towing vehicle.

Yet another object of the present invention is to provide a method for distributing the tongue weight of the trailer evenly over the front and rear wheels of the towing vehicle wherein the tilt angle of the ball mount head on the hitch bar may be selectively adjusted in a relatively simple and convenient manner without requiring the removal of the spring bars or other hardware.

Yet another object of the invention is to provide a weight distributing hitch assembly wherein a unique spring bar retainer is provided for holding the spring bars in position in the ball mount head. Advantageously, the retainer provides quick and convenient visual confirmation of the securing of the spring bars in position.

Yet another object of the invention is to provide a weight distributing hitch assembly including a spring bar retainer of integral, one-piece design including a pair of squeeze grips, a pair of mounting tabs for engaging in cooperating mounting holes in the ball mount head and a pair of intermediate leg sections for engaging in grooves of the spring bars to hold the spring bars in position. Such a retainer is particularly easy to use and always maintained in ready position on the ball mount head to secure the spring bars in position.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved weight distributing hitch assembly is provided for towing a trailer behind a vehicle. The weight distributing hitch assembly includes a hitch bar of a type known in the art for mounting to the towing vehicle. More specifically, the hitch bar includes a mounting post that is received in the receiver box of a hitch receiver of the type known in the art that is secured to the frame of the towing vehicle in a known manner.

The weight distributing hitch assembly also includes a ball mount head for mounting on the distal or head receiving end of the hitch bar at a selected tilt angle. Further, a pair of spring bars are received in cooperating apertures in the ball mount head. As is known in the art and described in greater detail below, these spring bars are particularly adapted for distributing the tongue weight of the tailer relative to the front and rear wheels of the towing vehicle.

Additionally, in accordance with an important aspect of the present invention, the weight distributing hitch assembly includes an eccentric adjustment means or element fixed to either the hitch bar or the ball mount head. The eccentric adjustment element has a cam face for engaging the other of the hitch bar or ball mount head whereby selective positioning of the eccentric adjustment element allows selective adjustment of the tilt angle of the ball mount head to aid in proper distribution of the tongue weight of the trailer relative to the vehicle. Advantageously, by adjusting the ball mount head to the proper tilt angle and properly securing the spring bars to the trailer, the trailer tongue weight or load may be more evenly distributed between the front and rear wheels of the vehicle to provide a more level, stable ride for better vehicle control during vehicle operation.

More preferably, the eccentric adjustment means comprises an eccentric washer and means such as a bolt and cooperating nut for fastening the washer to either the hitch bar or the ball mount assembly. Preferably, the washer is six-sided to provide six adjustment positions. Advantageously, each side is of sufficient length to provide secure engagement with the other of the hitch bar or ball mount head so as to secure the ball mount head at the selected tilt angle and substantially eliminate any possibility of slipping. Still more preferably, the eccentric adjustment mechanism includes a pair of eccentric washers, one on each of the two sides of the hitch bar and the ball mount head.

In accordance with yet another aspect of the present invention, each spring bar of the present assembly includes a proximal end for receipt in a cooperating aperture in the ball mount head. Each proximal end includes a groove in the end. A spring bar retainer fixed to the ball mount head is positionable in the groove of each spring bar to hold the spring bar in position relative to the ball mount head. Preferably, the spring bar retainer is of one-piece, integral construction and includes a pair of squeeze grips, a pair of mounting tabs for engaging in cooperating holes in the ball mount head and a pair of intermediate leg sections for engaging the grooves of the spring bars. Such a spring bar retainer may, for example, be formed from a single piece of spring steel.

Advantageously, such a spring bar retainer is maintained in ready position for use on the ball mount head. Accordingly, it cannot be misplaced and lost and is, therefore, more convenient to utilize. Additionally, it is of more durable construction than many prior art locking pins used for this purpose. Thus, the retainer provides a long and dependable service life. Still further, it should also be appreciated that engagement of the leg sections of the spring bar retainer in the turned grooves of the spring bars may be relatively easily visually confirmed. Accordingly, proper installation of the spring bars can be verified quickly and easily so as to enhance the confidence and satisfaction of the user/operator.

In accordance with yet another aspect of the present invention, a method is provided for adjusting the tilt angle of a ball mount head relative to the hitch bar. More specifically, the method includes the initial step of loosening fastening means that mount an eccentric angle adjusting washer or element to one of the hitch bar and ball mount head. Next is the step of rotating the eccentric angle adjusting element into a desired position relative to the hitch bar and ball mount head. Once properly adjusted there is the retightening of the fastening means to hold the eccentric angle adjusting element in the newly established, desired position.

More specifically, the method includes the additional step of axially shifting the eccentric angle adjusting element on the fastening means so as to allow clearance for the rotation thereof to bring the eccentric angle adjusting element into the desired position. The element is then axially shifted back into a position where the cam surfaces thereof engage the other of the ball mount head and hitch bar. The engagement establishes the tilt angle of the ball mount head relative to the hitch bar.

Advantageously, it should be appreciated that this method of adjusting the relative tilt angle of the ball mount head with respect to the hitch bar may be performed without first removing the spring bars or any other hardware. Accordingly, the adjustment is simplified over prior art designs. It requires significantly less time to complete and is more convenient for the individual performing the operation.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
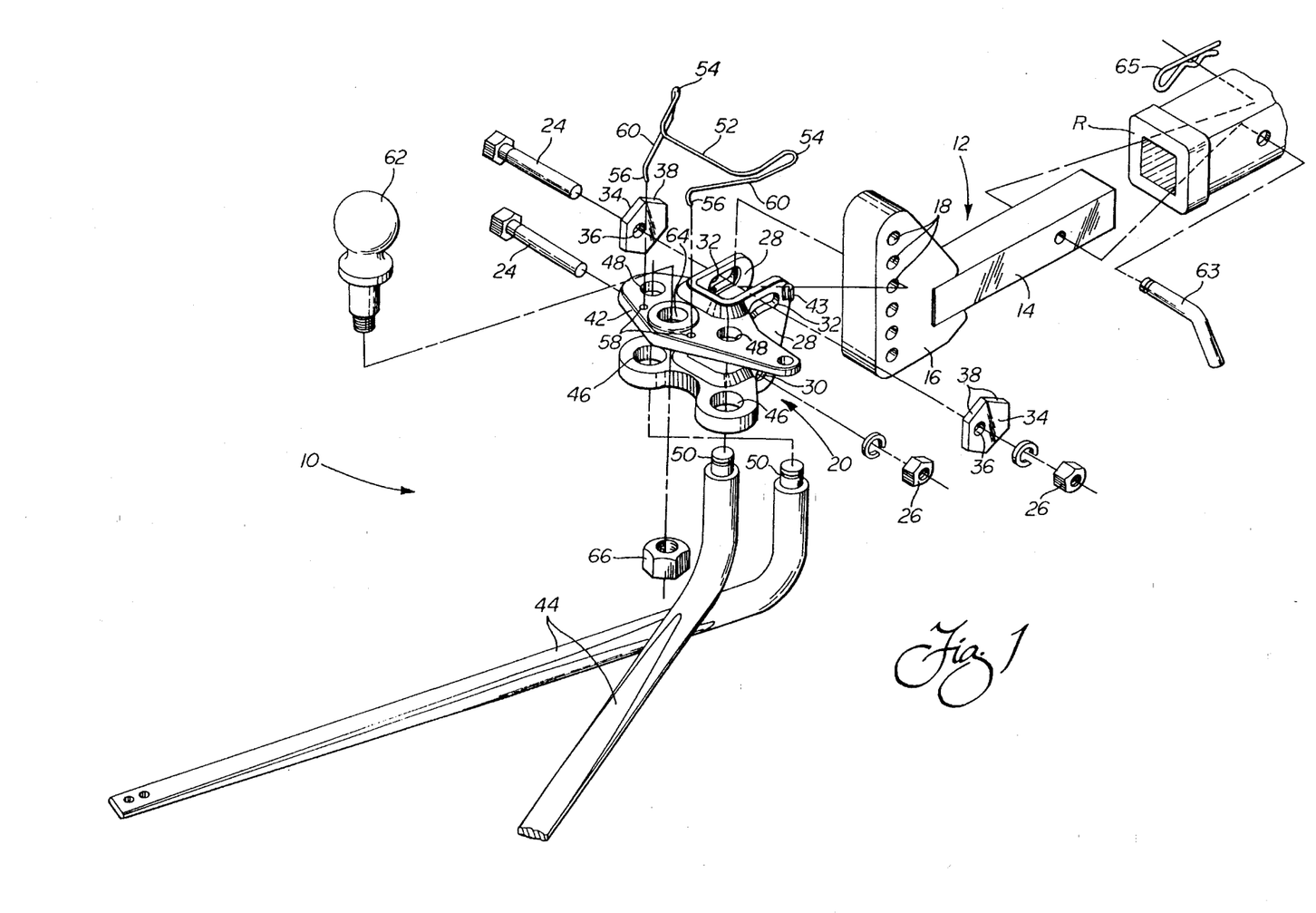
FIG. 1 is an exploded view of the weight distributing hitch assembly of the present invention for towing a trailer behind a vehicle.
Figure 4:
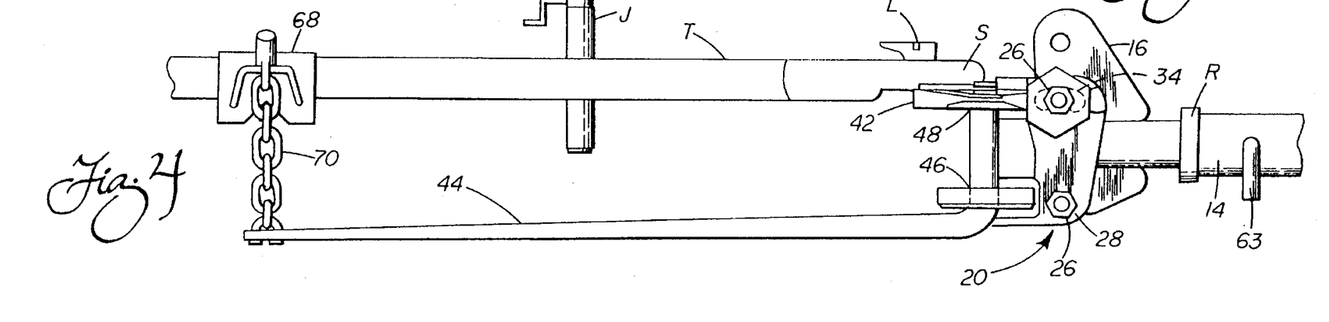
FIG. 4 is a partial, schematical view showing the weight distributing hitch assembly of the present invention connected between the vehicle and the trailer.

Reference is now made to FIG. 1 showing the weight distributing hitch assembly 10 of the present invention. As should be appreciated the hitch assembly 10 includes a hitch bar 12 of the type known in the art including a tubular, mounting post 14 for engagement in the receiver box R of a hitch receiver mounted to a vehicle (see FIG. 4, for simplicity the full hitch receiver and vehicle are not shown). Such a hitch receiver is, for example, a Class III or Class IV Series 35000 and 36000 hitch receiver manufactured by Reese Products, Inc. of Elkhart, Ind., the assignee of the present invention.

Figures 2, 3:
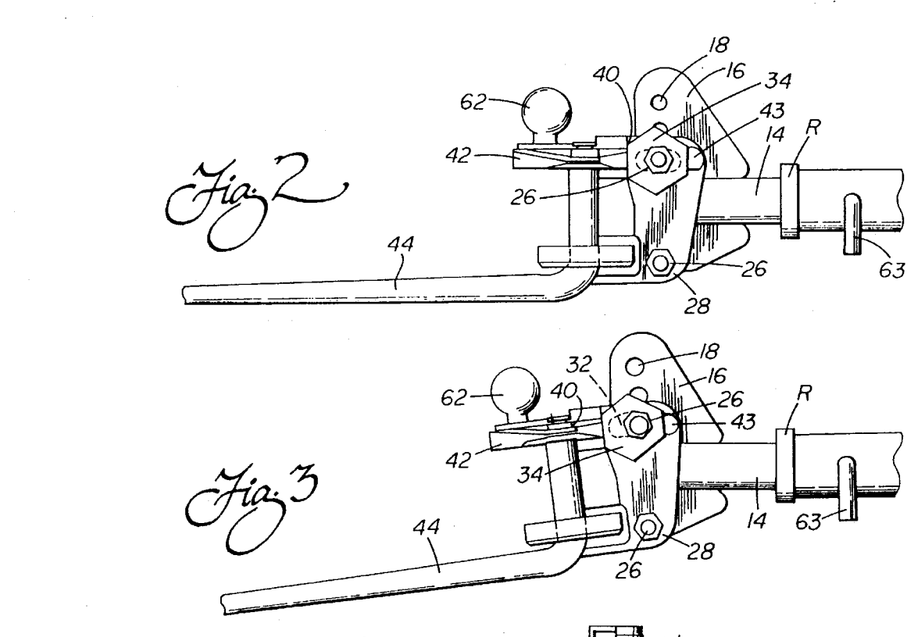
FIG. 2 is a detailed side elevational view showing the ball mount head vertically oriented on the hitch bar at a first tilt angle.
FIG. 3 is a cross sectional view similar to FIG. 2 but showing the ball mount head tilted with respect to the hitch bar at a second tilt angle.

The distal end of the hitch bar 12 includes a mounting rack 16 having a series of apertures 18 allowing for height adjustment of a ball mount head 20 as described below. The ball mount head 20 may be of one-piece, integral construction cast from ductile iron. The ball mount head 20 is secured to the mounting rack 16 of the hitch bar 12 by means of two cooperating fasteners shown as bolts 24 and cooperating nuts 26. As best shown in FIGS. 1–3, it should be appreciated that the ball mount head 20 includes a pair of spaced, parallel mounting flanges 28 that form a yoke adapted to receive the mounting rack 16. When properly mounted, the lower bolt 24 extends through the aligned cooperating apertures 30 in the mounting flanges 28 and the one aligned aperture 18 in the interdisposed mounting rack 16.

Similarly, the upper bolt 24 extends through aligned cooperating arcuate slots 32 in the mounting flanges 28 and an aligned aperture 18 in the interdisposed mounting rack 16. The arcuate slots 32 allow the ball mount head 20 to be pivoted relative to the hitch bar 12 about the lower bolt 24. As is known in the art and described in greater detail below, this pivotal adjustment of the tilt angle of the ball mount head 20 relative to the hitch bar 12 allows adjustment of the weight distributing characteristics of the hitch assembly 10 so as to allow the trailer tongue weight to be evenly distributed over the front and rear wheels of the towing vehicle.

The angular adjustment of the tilt angle of the ball mount head 20 may conveniently be made by manipulation of the indexable, eccentric six-sided washers 34; one washer mounted adjacent to and just outside each mounting flange 28. Each washer 34 includes an off-center aperture 36 through which the upper bolt 24 is extended when the ball mount head 20 is mounted to the hitch bar 12. As the upper bolt 24 extends through an aperture 18 in the hitch bar 12, it should be appreciated that in the embodiment shown each of the washers 34 is fixed relative to the hitch bar.

Each of the six sides of the washers 34 effectively function as a cam surface 38 that may be selectively positioned to engage the trailing edge 40 of the ball mounting platform 42 and the stop 43 both on the ball mount head 20. This engagement of the washers 34 on two opposing sides by the edge 40 and stop 43 substantially eliminates any possibility of slipping and insures that the tilt angle of the ball mount head 20 is positively maintained at all times during vehicle operation. Accordingly, consistent weight distributing characteristics are always provided for best vehicle control.

By selectively rotating/positioning the washers 34, it should be appreciated that the relative tilt angle of the ball mount 20 with respect to the hitch bar 12 may be adjusted as desired to a selected position. For example, as shown in FIG. 2, a forward tilt angle may be provided when the washers 34 are positioned with the shortest side (e.g. the shortest distance from the aperture 36 to the cam surface 38) in engagement with the edge 40 of the platform 42 and the longest side in engagement with the stop 43. Alternatively, as shown in FIG. 3, the ball mount 20 may be positioned at a rearward tilt angle (from vertical) relative to the hitch bar 12 when the longest side (i.e. the cam surface 38 the furthest distance from the aperture 36) is placed in engagement with the edge 40 of the platform 42 and the shortest side is placed in engagement with the stop 43. It should further be appreciated that four intermediate positions between these two extremes are available when the other sides or cam surfaces 38 of the eccentric washers 34 are rotated/positioned in engagement with the edge 40 and stop 43.

Advantageously, the six-sided eccentric washers 34 allow the ball mount head 20 to be positioned at six different tilt angles with respect to the hitch bar 12. The position selected is determined by the weight distribution characteristics of the hitch assembly 10 necessary to equally spread the tongue weight of the trailer between the front and rear wheels of the towing vehicle. With the possibility of six different positions, good flexibility and versatility is provided to meet the needs for weight distribution in substantially any towing situation. Further, the six sides are each of sufficient length and depth to provide secure engagement with the edge 40 of the platform 42 and the stop 43 thereby preventing any slipping and an inadvertent change in the tilt angle that could adversely affect the weight distributing characteristics of the hitch when under load. Accordingly, dependable and reliable performance is provided.

As best shown in FIG. 1, the weight distributing hitch assembly 10 also includes a pair of spring bars 44. Each spring bar 44 is substantially L-shaped and includes a proximal end for receipt in cooperating apertures 46, 48 in the ball mount head 20. Further, each proximal end includes a turned groove 50. When the spring bars 44 are fully inserted in the apertures 46, 48 of the ball mount head 20, the turned grooves 50 just extend above the plane of the ball mounting platform 42.

Figure 5:
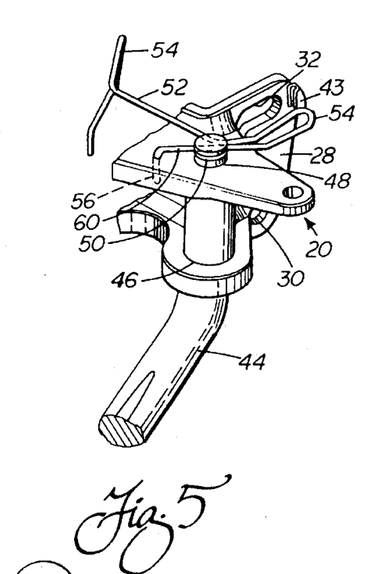
FIG. 5 is a detailed perspective view of the integral, one-piece spring bar retainer.
Figure 6:
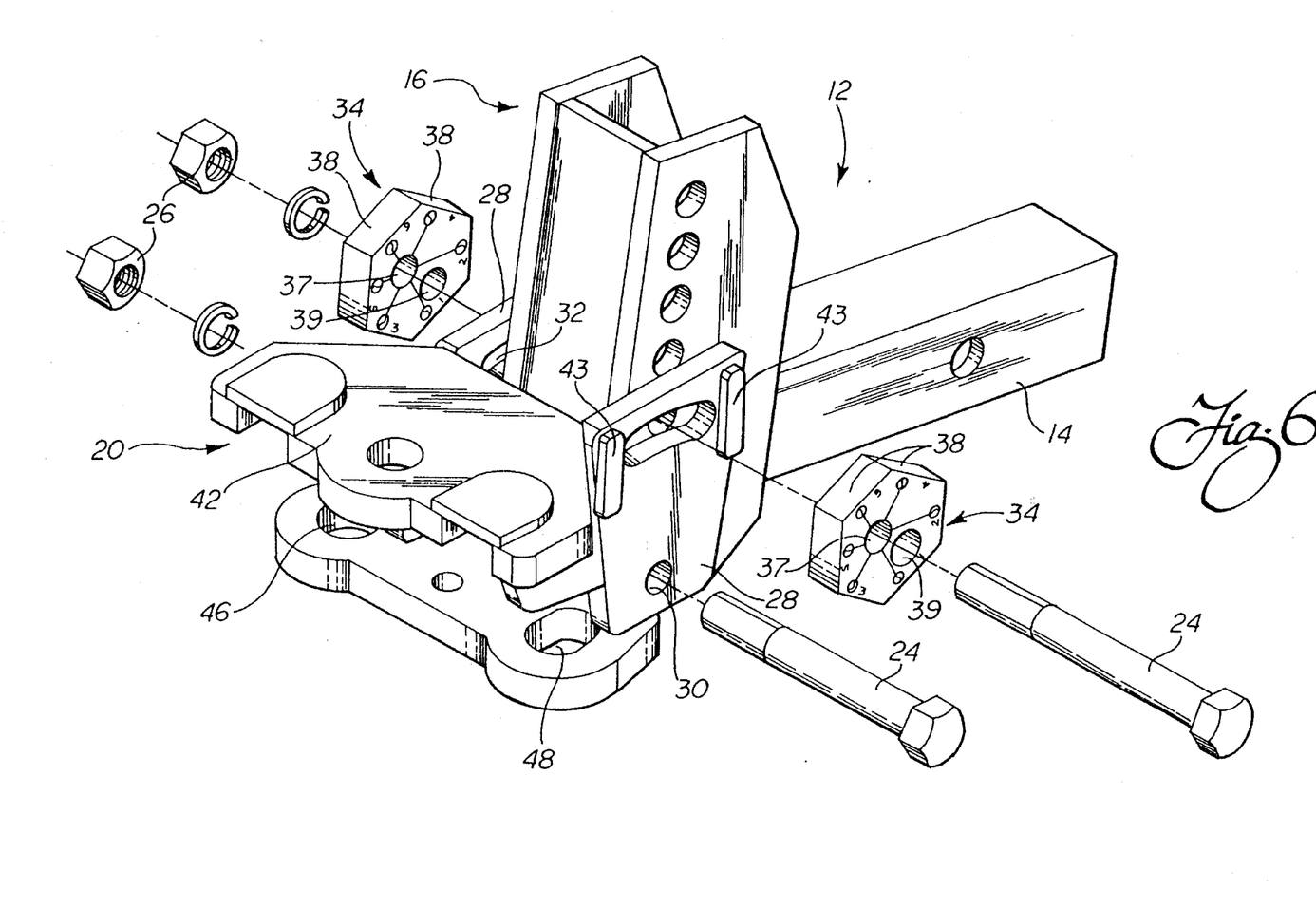
FIG. 6 is a fragmentary perspective view showing the improved hitch assembly of the invention.

A one-piece, integral spring bar retainer 52 secures the spring bars 44 in position relative to the ball mount head 20. More specifically, the spring bar retainer 52 is preferably formed of a single piece of spring steel wire and includes a pair of squeeze grips 54, a pair of mounting tabs 56 for engaging in cooperating mounting holes 58 in the ball mount head 20, and a pair of intermediate legs 60 for engaging in the grooves 50 of the spring bars 44 (see FIG. 5). Advantageously, the tabs 56 serve to secure the spring bar retainer 52 in position on the ball mount head 20 at all times. Accordingly, as the spring bars 44 are inserted through the apertures 46, the grips 54 are squeezed to provide the necessary clearance past the legs 60 to move the spring bars into place. Once the spring bars 44 are fully inserted and in proper position, the grips 54 are released and the legs 60 spring back and are fully received in the grooves 50 to hold the spring bars 44 in position.

Advantageously, it should be appreciated that the groove 50 is turned in each of the spring bars 44 above the loaded area of the bars so that the bars are in no way weakened by this design. Further, it should be appreciated that the engagement of the legs 60 of the retainer 52 in the grooves 50 is easy to visually confirm. Thus, proper installation of the spring bars 44 is easily verified.

Additionally, it should be appreciated that the effectively permanent mounting of the spring bar retainer 52 on the ball mount head 20 prevents the retainer from being misplaced and lost. The retainer 52 may also be easily manipulated by means of the squeeze grips 54 when it is necessary to remove the legs 60 from the grooves 50 and allow removal of the spring bars 44. Additionally, the retainer 52 is made of a spring steel wire of such a size (0.125 inches in diameter) that is not easily overstressed. Accordingly, the retainer 52 provides reliable and dependable operation. Further, if the retainer 52 is ever bent it can usually be reshaped to its original effectiveness. Finally, if damaged beyond repair, the tabs 56 may be snapped out of the retaining holes 58 and the retainer 52 replaced at a minimal cost. All these features make the present hitch assembly 10 user friendly and significantly enhance user satisfaction.

The installation of the weight distributing hitch 10 of the present invention for towing a trailer behind a vehicle will now be described in detail. Initially, a towing vehicle and trailer are lined up on level pavement in a straight-ahead position while remaining uncoupled. The trailer tongue jack J may then be utilized to level the trailer T (see FIG. 4). Next, the distance from the pavement to the top of the coupler ball socket S on the trailer T is measured and recorded. A similar measurement is made to reference points on the front and rear bumpers of the vehicle (not shown). Next a "target" uncoupled ball height is determined for the tow vehicle. For trucks or other stiffly-sprung vehicles, $\frac{1}{16}$ inch is added to the measured and recorded height to the top of the coupler bar socket for each 100 pounds of tongue weight. For passenger cars, ⅛ inch is added for each 100 pounds of tongue weight.

The hitch bar 12 is then inserted into the receiver box R of the hitch receiver in a manner known in the art. A pin 63 and clip 65 are installed to secure the hitch bar 12 in position. A hitch ball 62 is then selected to match the trailer coupler socket S. The hitch ball 62 is installed so that the shank of the ball extends through the opening 64 in the platform 42. A nut 66 secures the ball in position.

Next the ball mount head 20 is mounted to the mounting rack 16 of the hitch bar 12. More specifically, the ball mount head 20 is positioned so that the mounting flanges 28 receive the mounting rack 16 therebetween. The ball mount head 20 is then moved up or down until the apertures 30 in the flanges 28 are positioned aligned with an aperture 18 in the mounting rack 16 with the ball 62 at approximately the target height. A bolt 24 is then inserted through the aligned apertures 18 and 30. A lock washer 25 and nut 26 are then utilized to secure the bolt 24 in position. The nut is not tightened at this time.

Next, the upper bolt 24 is secured into position. More specifically the upper bolt 24 is first inserted through an aperture 36 in an eccentric washer 34 then, through the arcuate slots 32 in the mounting flanges 28 and the aligned aperture 18 in the mounting rack 16, then through the aperture 36 in the second eccentric washer 34. The second bolt 24 is then secured in position with the lock washer 25 and nut 26. Before tightening the nut 26 onto the second bolt 24, the eccentric washers 34 are rotated to bring selected opposing sides or cam surfaces 38 into engagement with the edges 40 of the platform 42 and the stops 43. The same, corresponding cam surfaces 38 of the washers 34 are brought into engagement on each side of the ball mount head 20. The nut 26 is then finger tightened on the second bolt 24 to secure the indexable eccentric washers 34 in position.

Next the spring bars 44 are installed in the apertures 46, 48 of the ball mount head 20. As the spring bars 44 are inserted, the spring bar retainer 52 must be squeezed by the grips 54 to allow the necessary clearance past the legs 60 to move the spring bars into position. When released the retainer 52 springs the legs 60 into the grooves 50 allowing the operator to see that the bars 44 are locked in place. Using the tongue jack J, the coupler ball socket S is then lowered onto the ball 62 and the coupler latch L is closed. The front of the trailer T and rear of the tow vehicle are then raised (eg. two or three inches) by operation of the tongue jack J. The lift units 68, such as Reese Products, Inc. product no. 21160, are then installed in a manner known in the art. More specifically, the spring bars 44 are rotated parallel to the frame of the trailer T. The chains 70 extending from the distal end of each spring bar 44 are then extended vertically upward. A lift unit 68 is centered on the frame of the trailer in vertical alignment with each chain 70 and then secured in position.

The amount of leveling or load transfer is then adjusted by engaging different links of the chains 70 with the lift units 68. With the lift unit 68 in the raised and locked position, the operator pulls straight up firmly on a spring bar chain 70. The link closest to the chain hook is noted and the next link down is then marked. The lift unit 68 is then lowered/released and the marked link is connected to the lift unit 68. During this procedure it is necessary to make sure the chain 70 is not twisted. The lift unit 68 is then raised and secured with a safety pin in a manner known in the art. This procedure is then repeated for the opposite spring bar 44 using the corresponding link of the other chain 70. The trailer tongue jack J is then retracted so that the hitch assembly 10 is carrying the full trailer tongue weight.

The towing vehicle should settle evenly within about ½ inch. This can be confirmed by remeasuring the front and rear bumper reference points. If the front has settled much more than the rear, the number of chain links between the lift units 68 and the spring bars 44 should be increased. If the rear has settled much more than the front, then the number of chain links between the lift units 68 and the spring bars 44 should be reduced.

In the event the spring bars 44 are not approximately horizontal when even settling has been achieved, it is necessary to change the tilt angle of the ball mount head 20. In preparation for this procedure, the lift units 68 are lowered/released, the tongue jack J is reextended to lift the tongue weight off the hitch assembly 10 and the coupler socket S is disconnected from the ball 62.

Next is the loosening of the upper bolt 24 and nut 26 that secure the eccentric washers 34 in position. When loosened sufficiently, the washers 34 may be axially shifted along the bolt 24 away from the flanges 28 so that clearance is provided between the cam surfaces 38 of the washers and the edge 40 of the platform 42 as well as the stop 43.

Next is the rotating of the eccentric washer 34 so as to bring the desired cam surfaces 38 into position for engagement with the edge 40 and stop 43. The washers 34 are then axially shifted back to their original position adjacent the flanges 28 with the selected cam surfaces 38 in engagement with the edge 40 and stop 43. During this process it may be necessary to manually tip or pivot the ball mount head 20 relative to the hitch bar 12 about the lower bolt 24. After repositioning the eccentric washers 34 as described, the upper and lower bolts 24 and nuts 26 are retightened to hold the washers in the desired position. The spring bars 44 are then reconnected as previously described and adjusted to provide the proper weight distributing characteristics to allow the vehicle to be level during trailer towing for maximum comfort and driver control.

FIGS. 6 to 9 illustrate an alternative embodiment of the invention and the same reference numerals have been used to denote parts which correspond to those of the embodiment of FIGS. 1 to 5. In this arrangement, each of the cam washers 35 is provided with a pair of eccentric bores 37 and 39 instead of the single aperture 36 of the arrangement shown in FIGS. 1 to 5. This effectively doubles the number of adjustment positions which are available by selecting which of the bores 37 and 39 is to receive the bolts 24. As in the previous embodiment, the orientation of the washers 35 relative to the stop members 43 can be selected to give the appropriate height adjustment.

Figures 7, 8, 9:
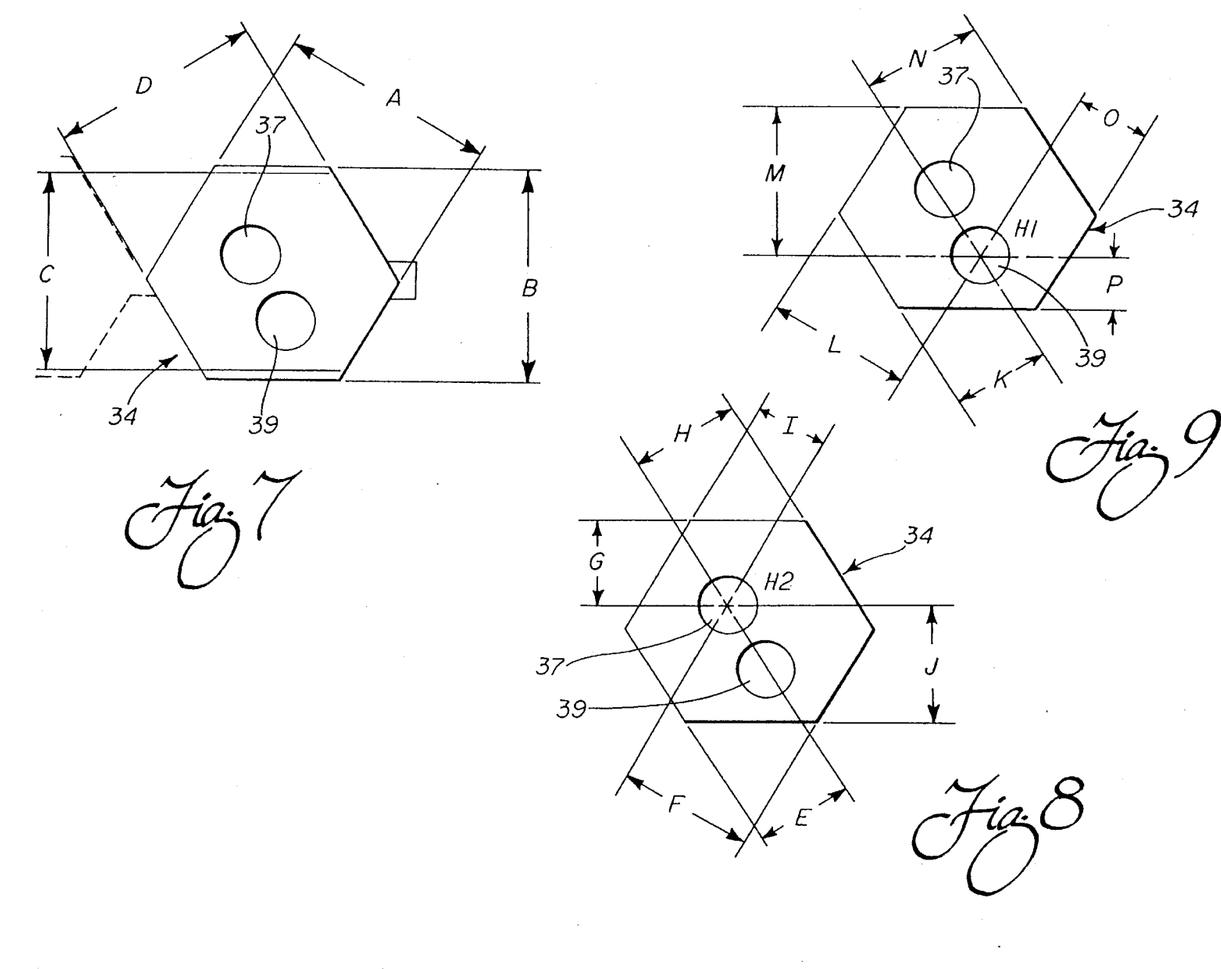
FIGS. 7 to 9 show the preferred dimensions of the cam washer for use in the hitch assembly of the invention.

In the preferred embodiment of the invention the dimensions of the washer are as follows: A: 60 mm; B: 65 mm; C: 60 mm; D: 60 mm; E: 28.5 mm; F: 38.5 mm; G: 25 mm; H: 31.5 mm; I: 21.5 mm; J: 35 mm; K: 27 mm; L: 39 mm; M: 45 mm; N: 33 mm; O: 21 mm; and P: 15 mm.

In summary, numerous benefits result from employing the concepts of the present invention. The weight distributing hitch assembly 10 of the present invention is particularly user friendly and convenient to install and adjust to provide even distribution of the tongue weight of the trailer over the front and rear wheels of the towing vehicle. The improved design allows simple adjustment of the angle of the ball mount head 20 through the rotated position of the eccentric washers 34. Further, the adjustment may be completed without removing the spring bars 44 or any other hardware from the assembly 10. This represents a significant advance over prior art designs which required at least removal of the spring bars. Accordingly, installation and adjustment time are significantly reduced. Additionally, a particularly effective spring bar retainer 52 is provided that is always mounted in proper position on the ball mount head 20 to lock the spring bars 44 in position when installed. Not only is the operation of this new spring bar retainer 52 convenient but it allows quick and simple visual confirmation of the locking of the spring bars in position.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the eccentric washers 34 could be fixed to the ball mount head 20 with the cam surfaces 38 thereof positionable into engagement with the hitch bar 12. In this way, angular adjustment could also be provided. Further, it should be appreciated that the eccentric washers 34 may include fewer or more sides than six and in fact could be round, oval or of some other design.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. A weight distributing hitch assembly for towing a trailer behind a vehicle, comprising:

a hitch bar for mounting to the vehicle;

a ball mount head for mounting on the hitch bar at a selected tilt angle;

spring bar means for distributing weight of the trailer relative to the vehicle;

adjustment means for selectively adjusting the tilt angle of said ball mount head relative to said hitch bar;

means for fixing said adjustment means relative to one of said hitch bar and said ball mount head;

a cooperating stop fixed to the other of said hitch bar and said ball mount head; and said adjustment means being characterized by an eccentric member having (1) a cam surface for engaging said cooperating stop on the other of said hitch bar and said ball mount head in order to provide a fixed relationship between said hitch bar and said ball mount head and (2) a pair of spaced, off-center apertures, said fixing means being selectively received through one of said off-center apertures whereby it is possible to provide the selected tilt angle of said ball mount head on said hitch bar for desired distribution of the tongue weight of the trailer.

2. The weight distributing hitch assembly as set forth in claim 1, wherein said eccentric member is six sided.

3. The weight distributing hitch assembly as set forth in claim 2, wherein a second eccentric member is provided, one eccentric member on each of two opposing sides of said hitch bar and said ball mount head.

4. The weight distributing hitch assembly as set forth in claim 1, wherein said spring bar means includes a pair of spring bars, each of said spring bars having a substantially L-shape.

5. The weight distributing hitch assembly as set forth in claim 4, wherein each of said spring bars includes a proximal end for receipt in a cooperating aperture in said ball mount head, said proximal end including a groove.

6. The weight distributing hitch assembly as set forth in claim 5, further including a spring bar retainer fixed to said ball mount head, said spring bar retainer being positionable in said groove of each spring bar to hold each of said spring bars in position relative to said ball mount head.

7. A hitch assembly for towing a trailer behind a vehicle, comprising:

a hitch bar for mounting to the vehicle;

a ball mount head for mounting on the hitch bar at a selected tilt angle;

an eccentric washer fixable relative to one of said hitch bar and said ball mount head and having a plurality of cam faces for engaging the other of said hitch bar and said ball mount head whereby selective positioning of said washer allows adjustment of the angle between the ball mount head and the hitch bar, said washer including more than one opening therein for receiving one of a mounting bolt and a pin thereby effectively increasing the number of selected angles between the ball mount head and the hitch bar.

8. A hitch assembly as set forth in claim 7, including a pair of said eccentric washers, one on each of two opposing sides of said hitch bar and said ball mount head and wherein said ball mount head includes mounting plates having curved slots therein and wherein there are abutment means located adjacent to the ends of the slots, the abutment means being engageable with selected cam faces on said washers.

9. A hitch assembly as claimed in claim 8, wherein each washer includes two mounting bolt holes therethrough, each hole being eccentrically located relative to the cam faces on said washers.

* * * * *

UNITED STATES PATENT AND TRADEMARK OFFICE
CERTIFICATE OF CORRECTION

PATENT NO. : 5,465,991
DATED : November 14, 1995
INVENTOR(S) : John J. Kass

It is certified that error appears in the above-indentified patent and that said Letters Patent is hereby corrected as shown below:

On the title page, item [75], change inventor "Wayne E. Sously" to --Wayne E. Sousley--.

Signed and Sealed this

Twentieth Day of February, 1996

Attest:

BRUCE LEHMAN

Attesting Officer     Commissioner of Patents and Trademarks